(12) United States Patent
Esselstrom et al.

(10) Patent No.: US 11,202,963 B2
(45) Date of Patent: Dec. 21, 2021

(54) BALANCED GAME CONTROLLER CLIP

(71) Applicant: Microsoft Technology Licensing, LLC, Redmond, WA (US)

(72) Inventors: Tyler Paul Esselstrom, Mercer Island, WA (US); Kenneth Alan Lobb, Sammamish, WA (US); Joseph Wheeler, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 79 days.

(21) Appl. No.: 16/406,863

(22) Filed: May 8, 2019

(65) Prior Publication Data

US 2020/0353369 A1 Nov. 12, 2020

(51) Int. Cl.
| | |
|---|---|
| *A63F 13/98* | (2014.01) |
| *A63F 13/23* | (2014.01) |
| *F16B 2/12* | (2006.01) |
| *F16B 2/22* | (2006.01) |

(52) U.S. Cl.
CPC .............. *A63F 13/98* (2014.09); *A63F 13/23* (2014.09); *F16B 2/12* (2013.01); *F16B 2/22* (2013.01); *A63F 2300/1025* (2013.01)

(58) Field of Classification Search
CPC .. A63F 13/98; A63F 13/23; A63F 2300/1025; F16B 2/12; F16B 2/22
USPC ......................................................... 463/31
See application file for complete search history.

(56) References Cited

U.S. PATENT DOCUMENTS

| | | | |
|---|---|---|---|
| 7,833,097 B1 * | 11/2010 | Maddox | A63F 13/23 463/36 |
| 8,659,887 B2 * | 2/2014 | Lee | F16M 13/00 361/679.3 |
| 9,802,118 B2 * | 10/2017 | Hirshberg | A63F 13/98 |
| 2004/0023719 A1 | 2/2004 | Hussaini et al. | |
| 2014/0200085 A1 * | 7/2014 | Bares | A63F 13/98 463/47 |
| 2015/0289641 A1 | 10/2015 | Ergun et al. | |
| 2016/0001176 A1 * | 1/2016 | Chen | A63F 13/24 463/37 |
| 2018/0165227 A1 | 6/2018 | Maldonado | |

FOREIGN PATENT DOCUMENTS

| | | |
|---|---|---|
| EP | 3012002 A1 | 4/2016 |
| KR | 20140024234 A | 2/2014 |

OTHER PUBLICATIONS

"Cell Phone Tablet Video Game Stand, Lamicall Multi-Angle Stand", Retrieved from https://www.amazon.com/Multi-Angle-Stand-Nintendo-Switch-Lamicall/dp/B01M0A7EAE?ref_=fsclp_pl_dp_2, Mar. 26, 2019, 9 Pages.

(Continued)

*Primary Examiner* — Allen Chan
(74) *Attorney, Agent, or Firm* — Ray Quinney & Nebeker P.C.; Paul N. Taylor

(57) ABSTRACT

A display mount for connecting electronic devices includes a body, a display support, and a movable arm connected to the body and the display support. The body has a lower surface and an upper surface. The body further includes a controller connection mechanism. The arm is positioned above the upper surface to hold the display support above the body and opposite the lower surface.

20 Claims, 11 Drawing Sheets

(56) References Cited

OTHER PUBLICATIONS

"Dainslef Xbox One Controller Foldable Mobile Phone Holder Smartphone Clamp Game Clip for Microsoft Xbox One S Game Controller Steelseries Nimbus Duo for iPhone Samsung Sony HTC LG Huawei", Retrieved from https://www.amazon.com/Dainslef-Controller-Smartphone-Microsoft-Steelseries/dp/B01MSX55FM, Mar. 26, 2019, 7 Pages.

"Dedicated Game Holder Clip Mount Support Mobile Phone Clamp For PS3 Controller", Retrieved from https://yaoota.com/en-ke/product/dedicated-game-holder-clip-mount-support-mobile-phone-clam-2-price-from-jumia-kenya, Mar. 26, 2019, 4 Pages.

"Game Controller Handle Clip Mobile Phone Clamp Holder with OTG Cable for PS4 Controller", Retrieved From https://web.archive.org/web/20170717004710/https:/www.geekbuying.com/item/Game-Controller-Mobile-Phone-Clamp-Holder-for-PS4-Controller-Black-377325.html, Jul. 17, 2017, 2 Pages.

"Xbox One Controller Phone Clip", Retrieved from https://www.amazon.com/s/?ie=UTF8&keywords=xbox+one+controller+phone+clip&tag=mh0b-20&index=aps&hvadid=78615138507503&hvqmt=e&hvbmt=be&hvdev=c&ref=pd_sl_5f1kmske3e_e, Mar. 26, 2019, 6 Pages.

Chityil, Gyorgy, "Xbox One S controller & Apple iPhone 8 Plus—Over the top", Retrieved from https://www.shapeways.com/product/3EM34SKC5/xbox-one-s-controller-apple-iphone-8-plus-over, Mar. 26, 2019, 7 Pages.

"International Search Report and Written Opinion Issued in PCT Application No. PCT/US20/026956", dated Jul. 21, 2020, 12 Pages.

\* cited by examiner

BALANCED GAME CONTROLLER CLIP

BACKGROUND

Background and Relevant Art

Interactive and entertainment applications for computing devices have become a staple industry for both personal computing devices and dedicated gaming consoles. Portable electronic devices allow for convenient gameplay wherever the user may be. Portable electronic devices, such as smartphones and tablets, however, lack input devices that are designed, dedicated, or optimized for gameplay experiences. Further, users become accustomed to and develop a preference for the game controllers with which they are most familiar.

Conventional display mounts for game controllers position the display in plane with a surface of the controller, allowing the user to view both the display and the controller face at the same time. However, configuring the display and the game controller in the same plane can compromise gameplay comfort, viewing of the display, and control of the system.

BRIEF SUMMARY

In some embodiments, a display mount for connecting electronic devices includes a body, a display support, and a movable arm connected to the body and the display support. The body has a lower surface and an upper surface. The body further includes a controller connection mechanism. The arm is positioned above the upper surface to hold the display support above the body and opposite the lower surface.

In some embodiments, a system for holding and controlling an electronic device includes a display device, a game controller, and a display mount. The display mount is connected to the display device and the game controller. The display mount includes a body, a display support, and a movable arm connected to the body and the display support. The body has a lower surface and an upper surface. The body further includes a controller connection mechanism. The movable arm positions the display device and the game controller relative to the display mount such that a system center of mass is between the upper surface of the body and the display support.

In some embodiments, a display mount for connecting electronic devices includes a body, a display support, and a four bar linkage arm connected to the body and the display support. The body has a lower surface and an upper surface. The body further includes a controller connection mechanism. The controller connection mechanism is elastically deformable to apply a compressive force to a game controller. The display support includes a first portion and a second portion that is slidable relative to the first portion to apply a compressive force to a display device. The four bar linkage arm is positioned above the upper surface to hold the display support above the body and opposite the lower surface.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which.

DETAILED DESCRIPTION

This disclosure generally relates to devices, systems, and methods for supporting an electronic display and/or processing device with an input device. More particularly, the present disclosure is related to balancing an electronic device on an input device and over the input device to reduce fatigue on a user. The input device provides inputs to the electronic display or a computing device in communication with the electronic display. The electronic display can present information to the user while the user provides inputs on the input device.

Conventional game controller connections for portable displays support the display in plane with the input device and/or handles of the input device. The center of mass of the system is therefore positioned away from the input device and/or handles of the input device. When holding the input device to provide inputs, the user must apply a torque opposite that of gravity on the system, resulting in strain and fatigue on the user's hands and wrists.

In some embodiments, a display mount according to the present disclosure allows a user to hold and use a game controller and support an electronic display without experiencing a torque on the system. The display mount may support an electronic display, such as a smartphone, a tablet, a hybrid laptop, or other portable display device above an input device such as a game controller, touch-sensing device, motion sensing device, or other input device such that the center of mass of the electronic display is aligned in the direction of gravity with the input device.

While the present disclosure describes examples and embodiments of a display mount in reference to a smartphone and a game controller, it should be understood that the electronic display may be any electronic display capable of providing visual information to a user, and the input device may be any handheld device capable of receiving manual inputs from a user and relaying the input commands to a computing device.

The electronic display may be a liquid crystal display, a light emitting diode (LED) display, an organic LED display, an electronic ink display, or other displays. The electronic display may be integrated into a computing device or in data communication with a computing device.

In some embodiments, an input device may be a commercially available game controller, such as a SONY PLAYSTATION DUALSHOCK 4 gamepad, a MICROSOFT XBOX ELITE controller, a LOGITECH G F710 gamepad, a NINTENDO SWITCH JOYCON, or other handheld game controllers. In other embodiments, the input device may include a trackpad, a smartphone, or other touch-sensing device; a trackball or other rotatable ball sensing device; an accelerometer, gyroscope, or other motion-sensing device; or combinations thereof.

Figure 1:
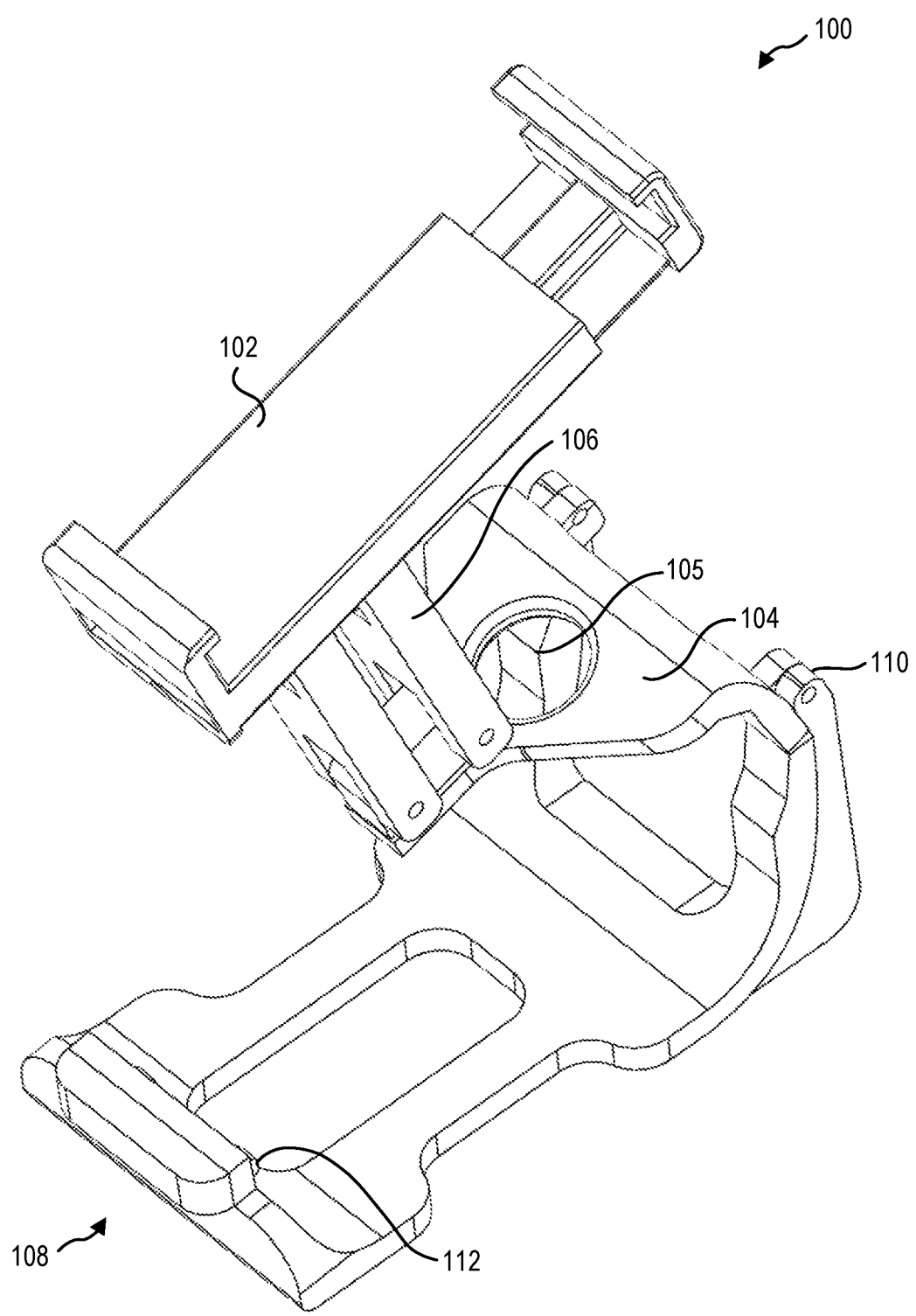
FIG. 1 is a perspective view of a display mount, according to at least one embodiment of the present disclosure.

FIG. 1 is a perspective view of a display mount 100 with a display support 102 and a body 104. The display support 102 and body 104 are spaced apart and coupled together by an adjustable arm 106 positioned therebetween. In some embodiments, the arm 106 is a single bar that is movable relative to at least one of the display support 102 or the body 104. In other embodiments, the arm 106 is movable relative to both the display support 102 and the body 104. For example, the arm 106 may be hinged at a connection with the body 104 to allow adjustment of an angle between the arm 106 and the body 104. In other examples, a connection between the arm 106 and the body 104 may be translatable relative to the body 104. In other examples, the arm 106 may be connected to the display support 102 and/or the body 104 with a ball-and-socket connection, allowing movement of the arm 106 relative to the display support 102 and/or the body 104 with multiple degrees of freedom.

In some embodiments, the display mount 100 has a single arm 106 connecting the body 104 to the display support 102. In other embodiments, the display mount 100 has two, three, four, or more arms 106 supporting the display support 102 relative to the body 104.

In some embodiments, the display support 102 mechanically holds the electronic display. For example, the display support 102 may include a clip, clamp, latch, or other device that applies a compressive force to the electronic display to retain the electronic display in the display support 102. In further embodiments, the display support 102 may include an adhesive. In yet further embodiments, the display support 102 may include a suction cup or other device that applies a suction to a surface of the electronic display to retain the electronic display in the display support 102. In an even further embodiment, the display support 102 may include a magnetic connector that uses a magnetic attraction force to retain the electronic display in the display support 102. Combinations of the foregoing are also within the scope of this disclosure.

In some embodiments, the body 104 includes a controller connection mechanism 108 that connects to and retains a game controller or other input device relative to the body 104. The body 104 may include one or more apertures 105 through which buttons, switches, joysticks, or other input mechanisms of the game controller may be accessible.

The controller connection mechanism 108 may include a clip, clamp, latch, or other device that applies a compressive force to the game controller to retain the game controller in the controller connection mechanism 108. In some embodiments, the controller connection mechanism 108 may include an adhesive. In further embodiments, the controller connection mechanism 108 may include a suction cup or other device that applies a suction to a surface of the game controller to retain the game controller in the controller connection mechanism 108. In yet further embodiments, the controller connection mechanism 108 may include a magnetic connector that uses a magnetic attraction force to retain the game controller in the controller connection mechanism 108. Combinations of the foregoing are also within the scope of this disclosure.

In at least one embodiment, the controller connection mechanism 108 is connected to the body 104 by a hinge 110 that allows the body 104 and controller connection mechanism 108 to at least partially enclose a game controller. For example, the controller connection mechanism 108 illustrated in FIG. 1 has a hinge 110 that allows the body 104 to move relative to the controller connection mechanism 108. For example, the controller connection mechanism 108 may apply a compressive force to the game controller to clasp the game controller. The body 104 may obscure at least a portion of the game controller, and the hinge 110 may allow temporary access to the entire face of the game controller without requiring the disconnection of the game controller from the controller connection mechanism 108.

In some embodiments, the controller connection mechanism 108 includes a mechanical interlock with the game controller. For example, the controller connection mechanism 108 illustrated in FIG. 1 includes a pair of protrusions 112 that engage with recesses in a game controller. The protrusions 112 or other mechanical interlocks may allow the controller connection mechanism 108 to securely retain the game controller and allow the body 104 to move relative to the controller connection mechanism 108 by the hinge 110. In some embodiments, the body 104 and/or controller connection mechanism 108 is elastically deformable to allow the body 104 and/or controller connection mechanism 108 to bend open, receive the game controller, and elastically return to the original position and retain the game controller.

Figure 2:
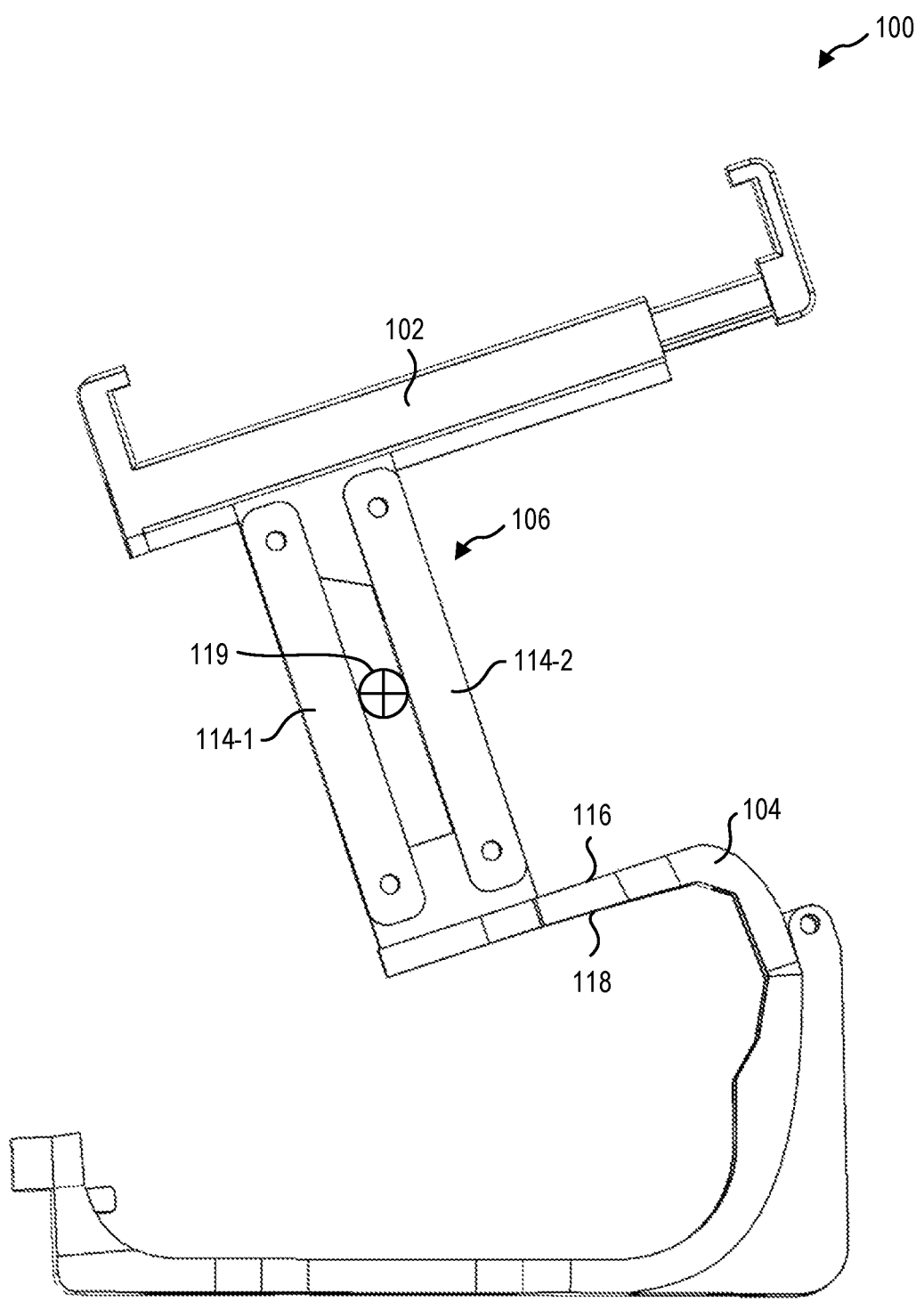
FIG. 2 is a side view of the display mount of FIG. 1, according to at least one embodiment of the present disclosure.

In some embodiments, the arm 106 is a four-bar linkage that allows movement of the display support 102 relative to the body 104 while maintaining an angle of the display support 102 relative to the body 104. FIG. 2 is a side view of the display mount 100 of FIG. 1. The arm 106 includes a first bar 114-1 and a second bar 114-2 that are each pivotably connected to the display support 102 and the body 104, respectively. The first bar 114-1 and second bar 114-2 are positioned parallel to one another. The first bar 114-1 and second bar 114-2, therefore, remain parallel to one another as the display support 102 moves relative to the body 104. The upper surface 116 of the body 104 and the display support 102 can, therefore, remain substantially parallel as well, in the illustrated embodiment. The display support 102 and body 104 remain at the same angle relative to one another as the display support 102 moves relative to the body 104 as will be described in relation to FIG. 4.

The body 104 has an upper surface 116 and a lower surface 118, where the display support 102 is positioned above the upper surface 116 and opposite the lower surface 118. The display mount center of mass (COM) 119 is therefore between the body 104 and the display support 102. In some embodiments, the display mount COM 119 is located within the arm 106. Positioning the display support above the upper surface 116 stacks the display above the controller, such that when a user holds the controller, the mass of the display support 102 and display apply less torque than having the display in plane with the body, as in a conventional mount.

Figure 3:
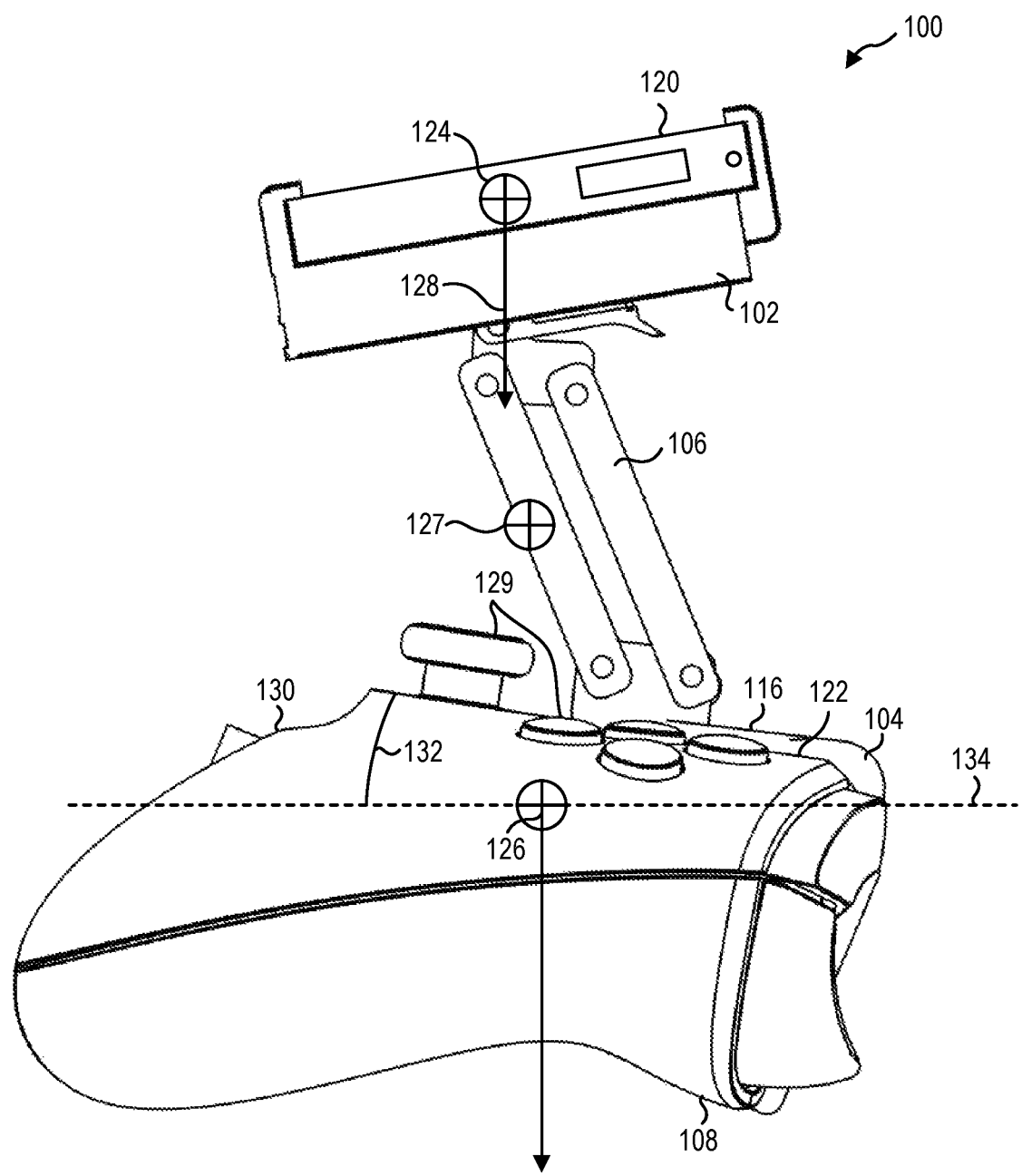
FIG. 3 is a side view of the display mount of FIG. 1 with a display and a game controller attached thereto, according to at least one embodiment of the present disclosure.

FIG. 3 is a side view of the display mount 100 with a display 120 positioned in the display support 102 and a game controller 122 affixed to the body 104 by the controller connection mechanism 108. The display 120 is located above the upper surface 116 of the body 104 when the display 120 is oriented facing a user (e.g., a user holding the game controller 122 can see the images on the display 120). The display mount 100 positions a display COM 124 of the display 120 above the game controller 122, and the system COM 127 may be positioned above the upper surface 116 of the body 104 and below the display support 102. In at least one example, the display mount 100 positions a display COM 124 above controller COM 126 of the game controller 122. For example, the display COM 124 is above the game controller 122 when a vector representing the force of gravity 128 on the display COM 124 intersects the game controller 122 when the display 120 is oriented facing a user. In another example, the display COM 124 is above the controller COM 126 when the display COM 124 is aligned with the controller COM 126 with respect to the direction of gravity 128 when the display 120 is oriented facing a user.

In other embodiments, the display support 102 is above the body 104 when a vector representing the force of gravity 128 on the display support 102 intersects the body 104. In another example, the display support 102 is above the body 104 when a COM of the display support 102 is aligned with a COM of the body 102 respect to the direction of gravity 128. In at least one example, the display support 102 is above the upper surface 116 when a vector representing the force of gravity 128 on the display support 102 intersects the upper surface 116 of the body 104 when the upper surface 116 is oriented at an angle between −30° and +45° from a horizontal plane.

The display 120 is also located above the buttons 129 of the game controller 122. By positioning the display COM 124 above the buttons 129 and/or above the controller COM 126, the user can interact with the buttons 129 of the game controller 122 without applying a torque to the display mount 100 and moving the display 120. For example, a MICROSOFT XBOX WIRELESS CONTROLLER has at least three directional buttons (D-pad and two joysticks), two analog triggers, two shoulder buttons, four face input buttons (X, Y, A, and B buttons), two menu and view buttons, and the system (XBOX) button. To interact with all of the buttons 129 for gameplay or system controls, the user grips the game controller 122 lightly between only the heel of the palm and the third through fifth fingers. In the example of a MICROSOFT XBOX ELITE CONTROLLER, buttons and/or switches on the rear of the game controller 122 (e.g., opposite the top surface 130) can further limit the available dexterity to hold the controller firmly. Therefore, aligning the display COM 124 and controller COM 126, and also aligning the display COM 124 and the buttons 129 to which the user applies forces, can stabilize the system and improve the user experience.

When a user is holding a game controller 122, the user will hold the controller in front of the user, with a top surface 130 of the game controller 122 at an angle 132 between +45° and −30° with respect to a horizontal plane 134 normal to gravity 128. For example, the top surface 130 of the game controller 122 illustrated in FIG. 3 is oriented at a −10° angle 132. In some embodiments, the arm 106 is movable relative to the body 104, and hence the game controller 122, to position the display COM 124 above the game controller 122 when the user holds the game controller 122 at an angle 132 between +45° and −30° with respect to a horizontal plane 134 normal to gravity 128. Thus, when the upper surface 130 of the controller 122 is tilted toward the user, the angle is a positive angle 132 and when the upper surface 130 of the controller 122 is tilted away from the user, the angle is a negative angle 132. The more closely aligned the display COM 124 is to the controller COM 126 with respect to the direction of gravity 128 when the user holds the game controller 122 at an angle 132 between +45° and −30° with respect to a horizontal plane 134 normal to gravity 128, the lower the torque due to gravitational force on the total system (i.e., the display 120, the display mount 100, and the game controller 122) can be.

Figure 4:
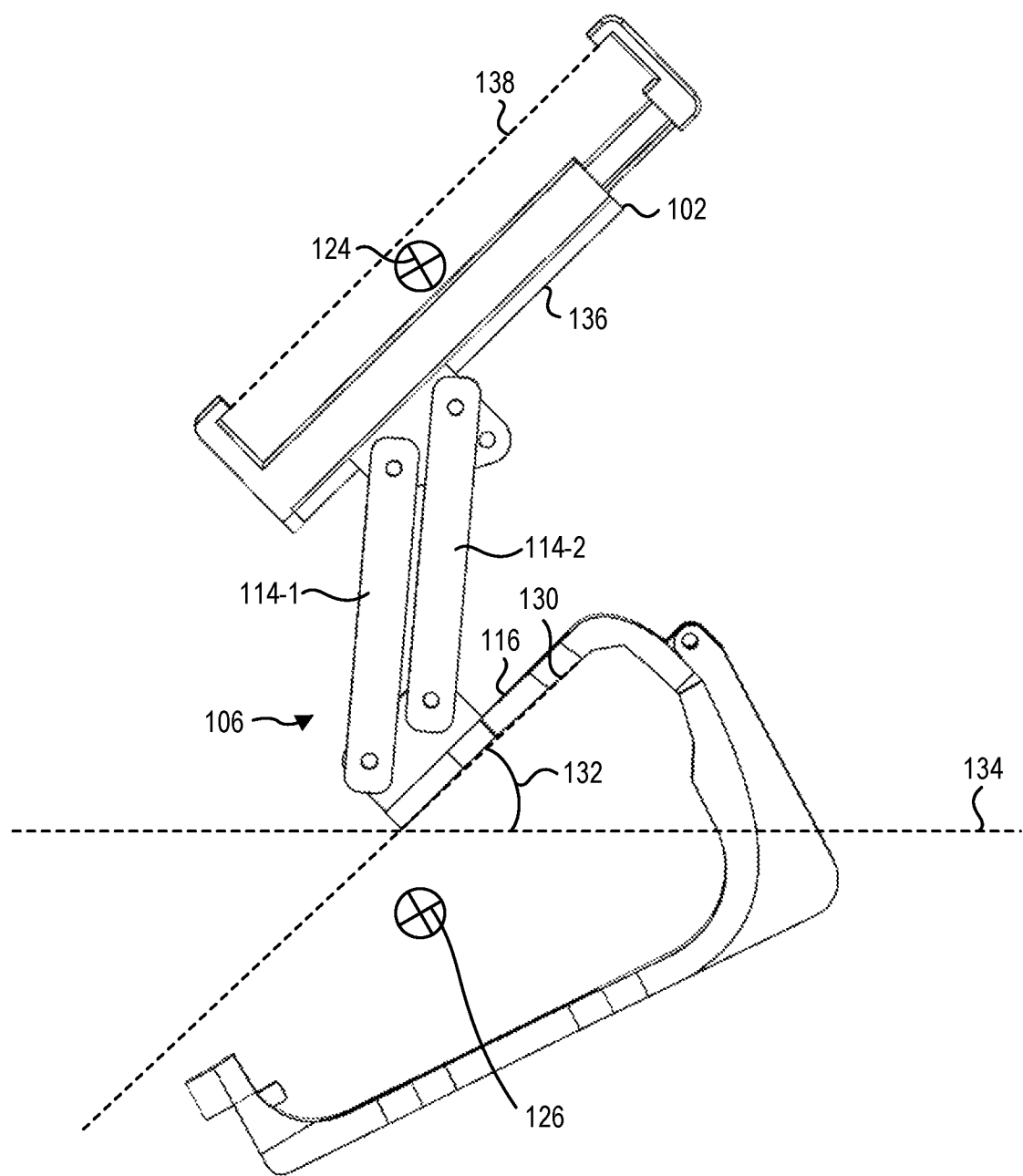
FIG. 4 is a side view of the display mount of FIG. 1 with the arm angled, according to at least one embodiment of the present disclosure.

For example, FIG. 4 illustrates the display mount 100 with the four bar linkage arm 106 moved relative to the body 104 and display support 102 when the game controller 122 is oriented with the top surface 130 at a +45° angle 132 to a horizontal plane 134. The arm 106 is moved to alter the position of the display support 102 relative to the body 104. With the top surface 130 of the game controller at the +45° angle 132, the display support 102 is moved such that display COM 124 is aligned with the controller COM 126.

In some embodiments, a range of motion of the arm 106 relative to the body 104 is in a range having an upper value, a lower value, or upper and lower values including any of 60°, 80°, 100°, 120°, 140°, 160°, 180°, or any values therebetween. For example, the range of motion of the arm 106 may be greater than 60°. In other examples, the range of motion may be less than 180°. In yet other examples, the range of motion may be between 60° and 180°. In further examples, the range of motion may be between 75° and 135°. In at least one example, the range of motion may be about 120°.

In some embodiments, with a four-bar linkage arm 106 with a first bar 114-1 and second bar 114-2 that are parallel and of equal length, the two surfaces to which the bars 114-1, 114-2 are connected remain at the same orientation relative to one another. In the embodiment illustrated in FIG. 4, this means the upper surface 116 of the body 104 and a bottom surface 136 of the display support 102 remain parallel. As the top surface 130 of the game controller is fixed relative to the upper surface 116 of the body 104 and a display surface 138 of the display is fixed relative to the bottom surface of the display support 102, the orientation of display surface 138 remains fixed relative to the angle 132 of the game controller 122 as the four bar linkage arm 106 moves.

Figure 5:
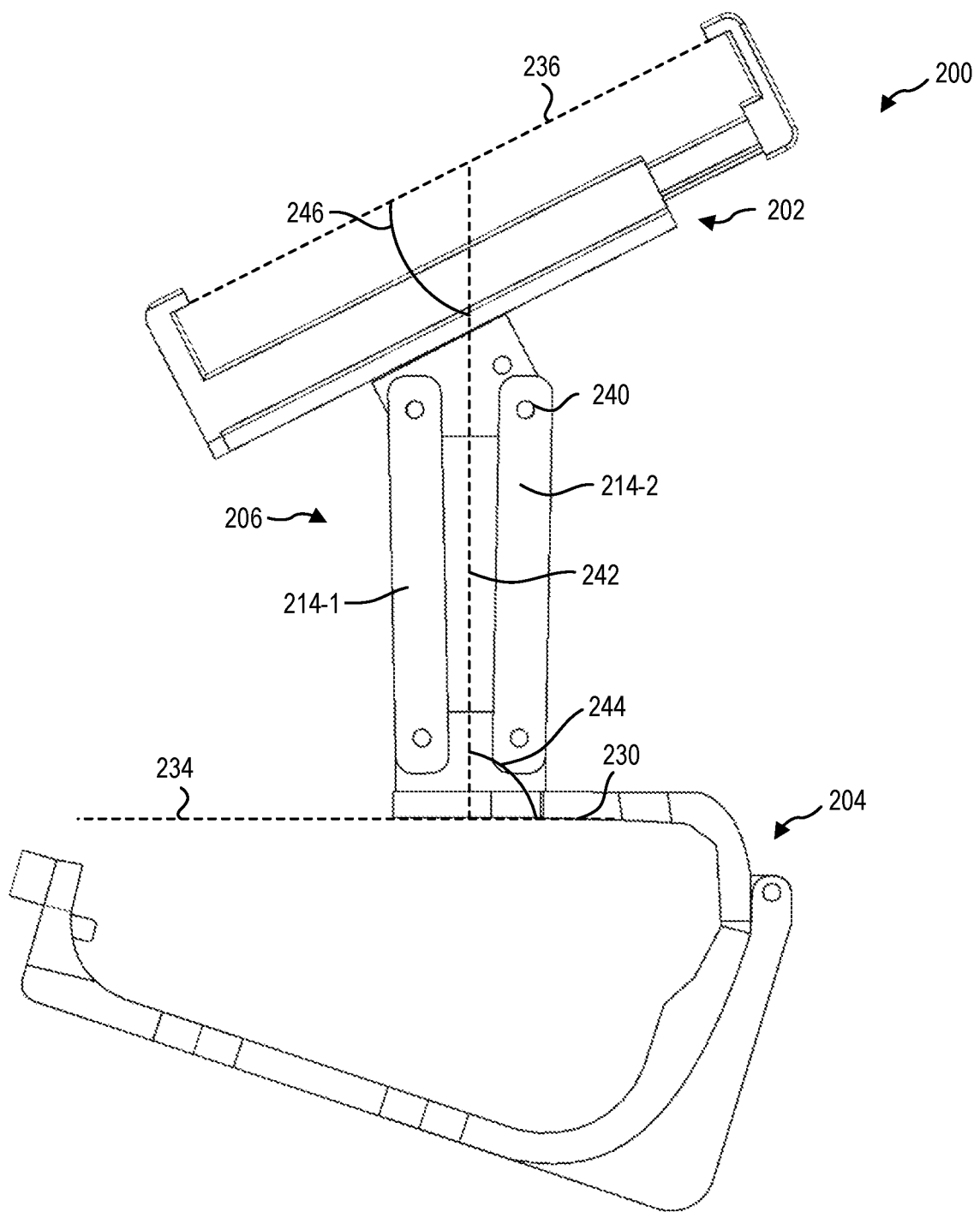
FIG. 5 is a side view of a display mount with a non-parallel linkage arm, according to at least one embodiment of the present disclosure.

In some embodiments, it may be desirable to have the orientation of a display surface change as the arm moves the display support relative to the body. FIG. 5 is a side view of another embodiment of a display mount 200 with a four bar linkage arm 260 where a first bar 214-1 and a second bar 214-2 are non-parallel (for example, by adjusting a connection point 240 of the second bar 214-2). The non-parallel first bar 214-1 and a second bar 214-2 produce a net rotation of the display support 202 and the body 204 relative to one another when the arm 206 moves relative to the display support 202 and body 204. In other embodiments, the first bar 214-1 and second bar 214-2 are different lengths and may achieve similar results.

The net rotation of the display support 202 and the body 204 relative to one another provides a net rotation of the display surface 236 relative to a top surface 230 of the game controller. The orientation of the game controller and the orientation of the display surface 236 are selected by a user based on the ergonomics of the user's body. For example, FIG. 5 illustrates a top surface 230 of a game controller that is parallel to a horizontal plane 234.

The display surface 236 however, may be oriented at an angle to the horizontal plane 234 to tilt the display surface 236 toward a user for easier viewing. The body 204 is oriented relative to an arm axis 242 at a body angle 244, and the display support 202 is oriented relative to the arm axis 242 at a display angle 246.

Figure 6:
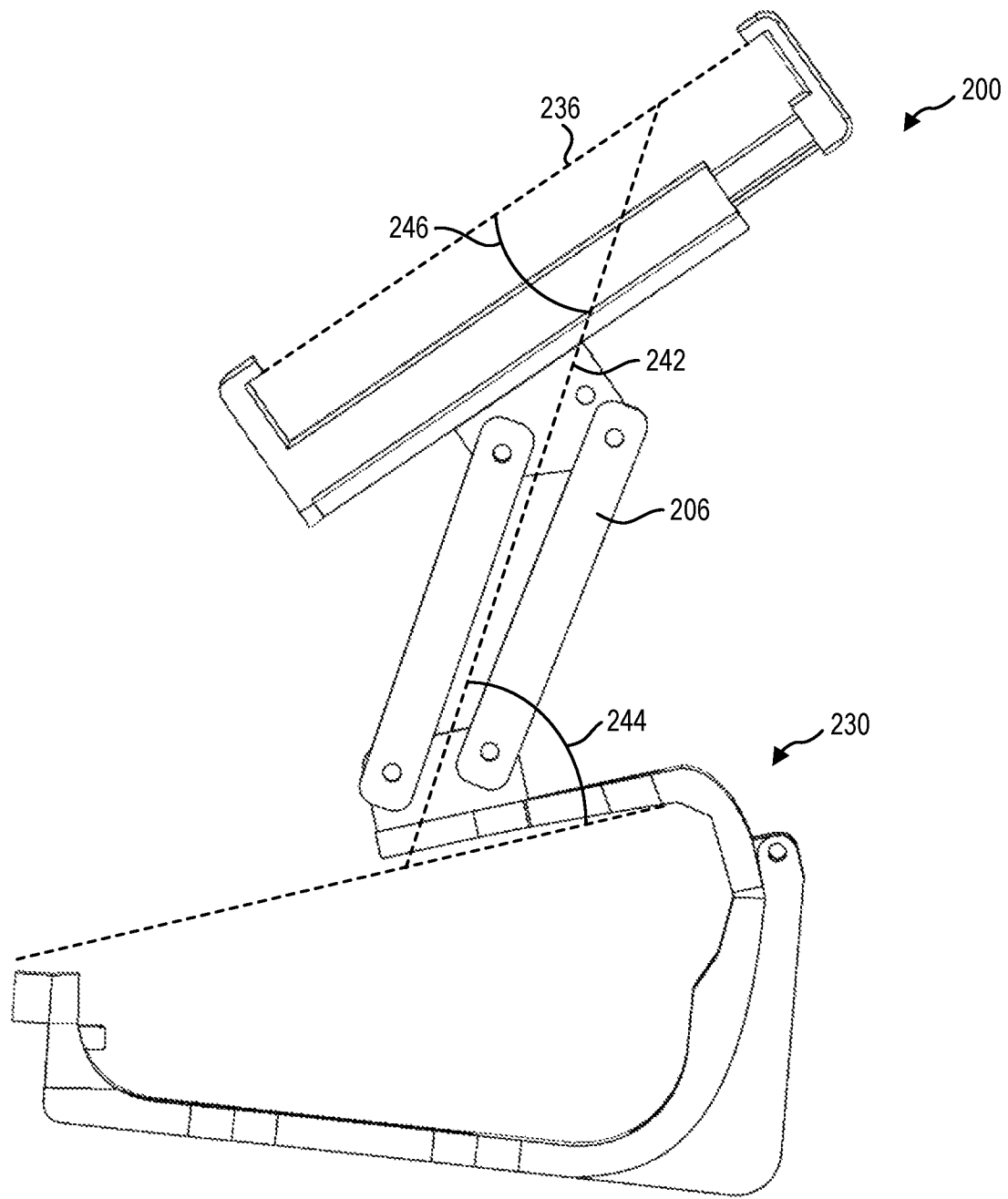
FIG. 6 is a side view of the display mount of FIG. 5 with the arm angled, according to at least one embodiment of the present disclosure.

As the user tilts the arm 206 in FIG. 6, the non-parallel linkage of the arm 206 compensates for a change in the height of the display support 202 above the body 204 by producing a net rotation of the display surface 236 to maintain the display surface 236 facing the user's eyes. For example, the display angle 246 relative to the arm axis 242 may decrease by a greater amount than the body angle 244. The net rotation can provide a more comfortable playing experience for a user at a broader range of positions of the arm 206.

Figure 7:
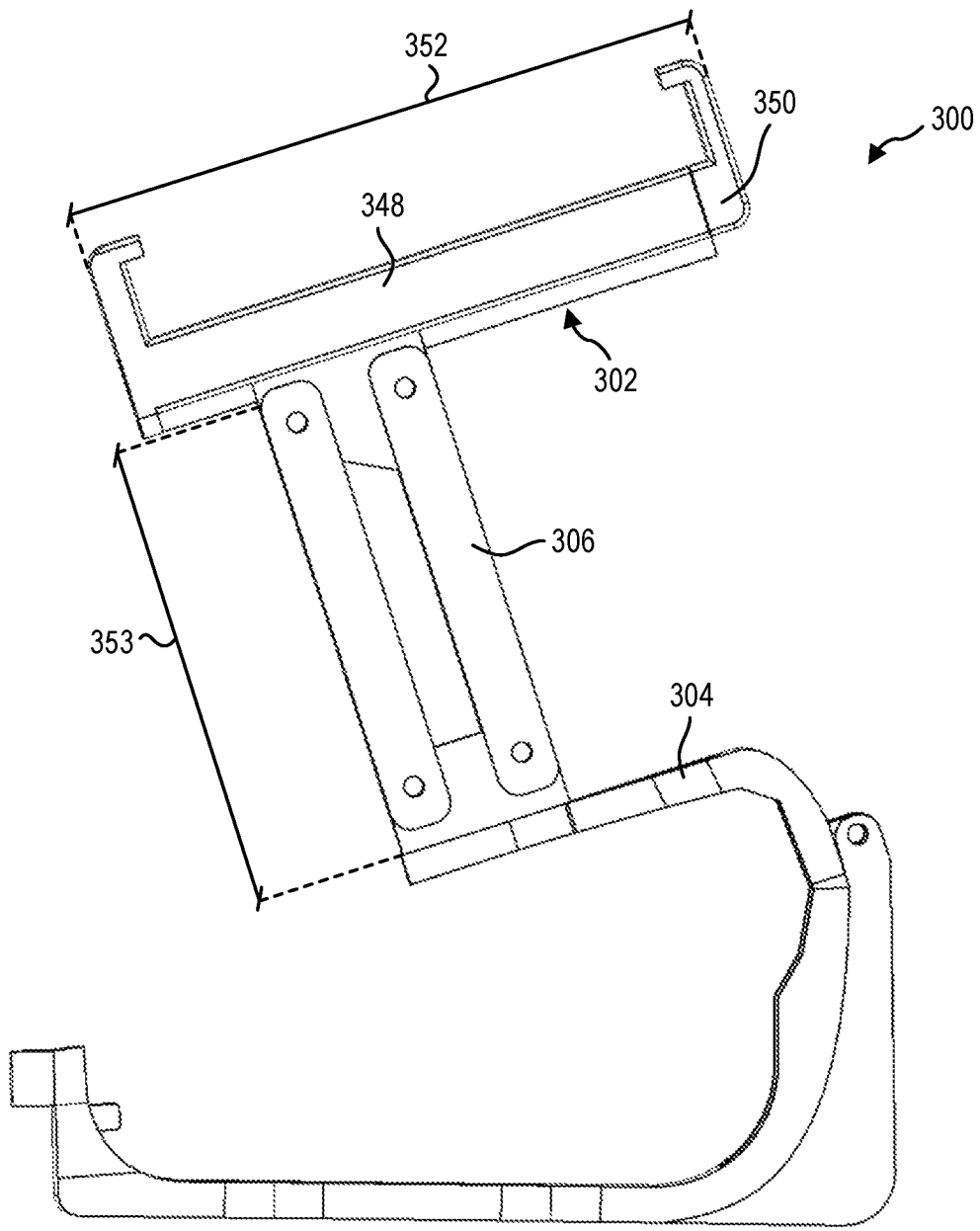
FIG. 7 is a side view of a display mount with a display support in a closed position, according to at least one embodiment of the present disclosure.
Figure 8:
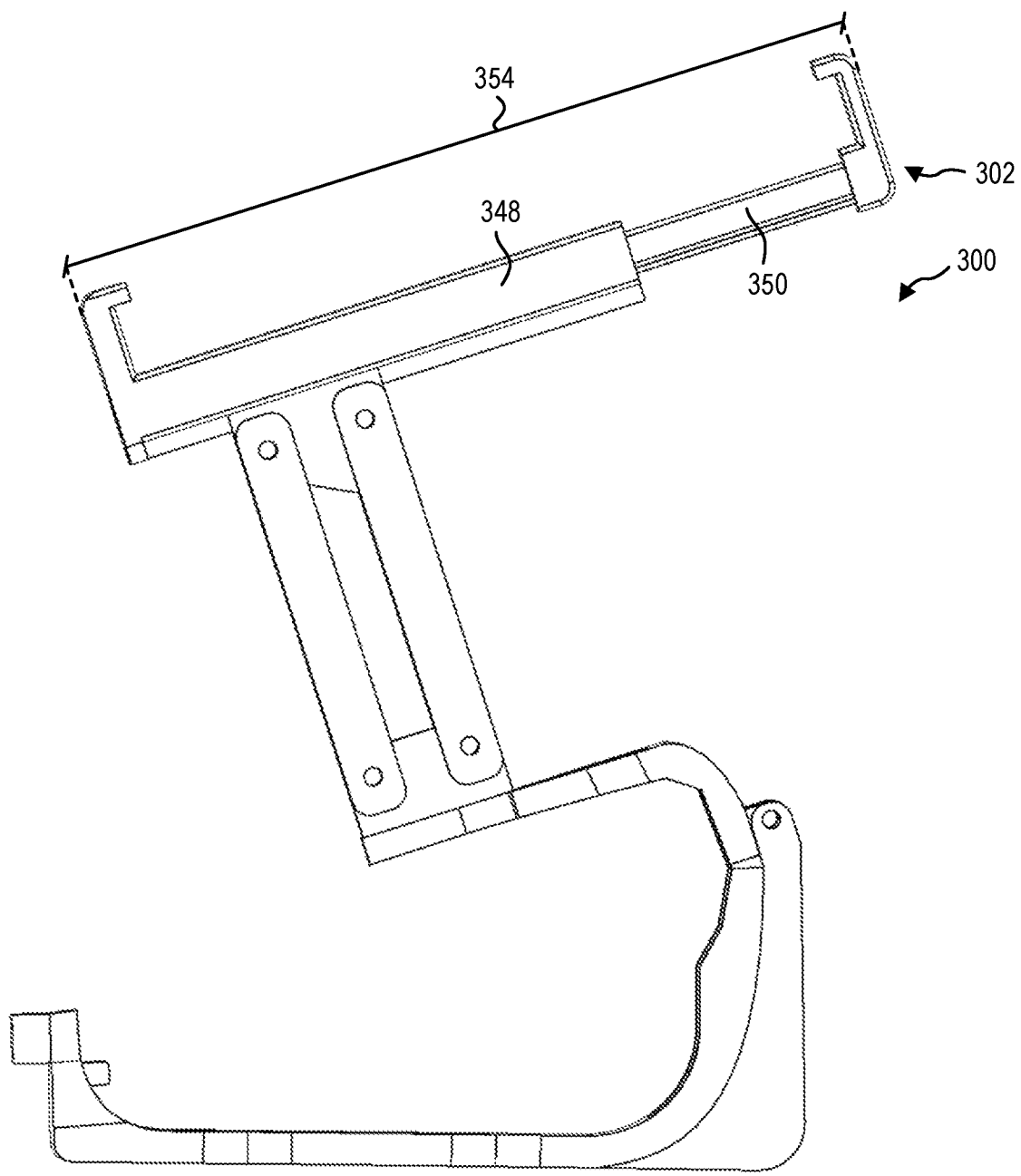
FIG. 8 is a side view of the display mount of FIG. 7 with the display support in an open position, according to at least one embodiment of the present disclosure.

Referring now to FIG. 7 and FIG. 8, in some embodiments, the display support 302 may be adjustable to accommodate a range of display device sizes. FIG. 7 is a side view of an embodiment of a display mount 300 with a display support 302 having a first portion 348 and a second portion 350 that are slidable relative to one another. The first portion 348 is connected to the arm 306 and the second portion 350 is movable relative to the first portion 348. FIG. 7 illustrates the display support 302 in a closed configuration and FIG. 8 illustrates the display support 302 in a fully open configuration.

In some embodiments, the closed configuration has a closed length 352 in a range having an upper value, a lower value, or upper and lower values including any of 2.25 inches, 2.3", 2.4", 2.5", 2.6", 2.7", 2.8", 2.9", 3.0", or any values therebetween. For example, the closed length 352 may be greater than 2.25". In other examples, the closed length 352 may be less than 3.0". In yet other examples, the closed length 352 may be between 2.25" and 3.0". In further examples, the closed length 352 may be between 2.4" and 2.8". In at least one example, the closed length 352 may be about 2.45".

In some embodiments, the arm 306 has an arm length 353 in a range having an upper value, a lower value, or upper and lower values including any of 1.0", 1.5", 2.0", 2.5", 3.0", 3.5", 4.0", 4.5", 5.0", or any values therebetween. For example, the arm length 353 may be greater than 1.0". In other examples, the arm length 353 may be less than 5.0". In yet other examples, the arm length 353 may be between 1.0" and 5.0". In further examples, the arm length 353 may be between 1.5" and 4.5'. In at least one example, the arm length 353 may be about 2.5".

In other embodiments, the arm length 353 may be adjustable. For example, the arm 306 may have a telescopic linkage, allowing the user to adjust the arm length 353 to raise or lower the display support 302 relative to the body 304 based upon the display size, the user's arm length, and preferred body position. For example, the arm length 353 may be adjustable from 1.0" to 5.0". In other examples, the arm length 353 may be adjustable from 2.0" to 3.0".

FIG. 8 shows the display support 302 in the fully open configuration. In some embodiments, the closed configuration has an open length 354 in a range having an upper value, a lower value, or upper and lower values including any of 3.0", 3.2", 3.4", 3.6", 3.8", 4.0", 4.5", 5.0", 6.0", or any values therebetween. For example, the open length 354 may be greater than 3.0". In other examples, the open length 354 may be less than 6.0". In yet other examples, the open length 354 may be between 3.0" and 6.0". In further examples, the open length 354 may be between 3.25" and 5.0". In at least one example, the open length 354 may be about 3.5".

Figure 9:
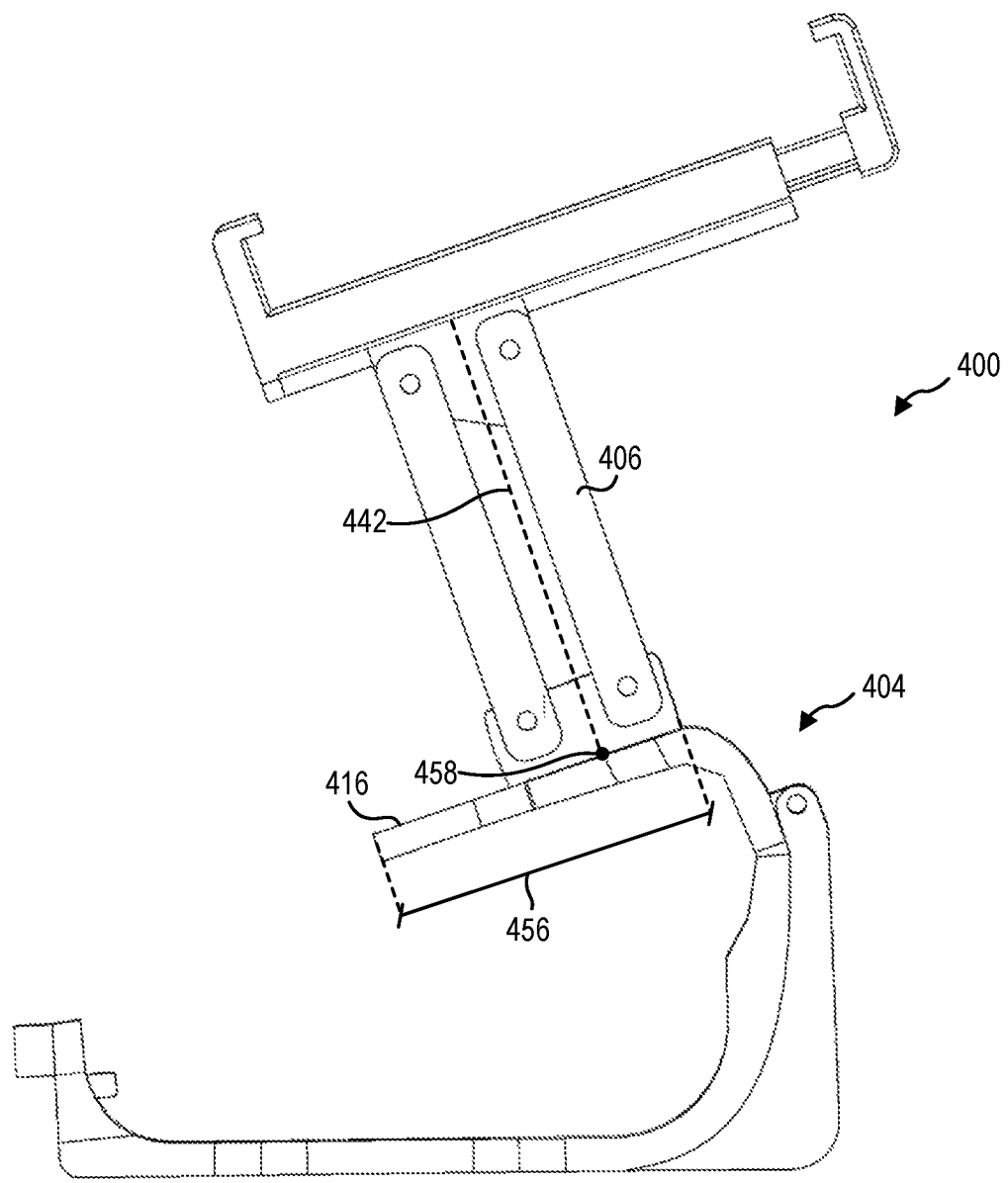
FIG. 9 is a side view of a display mount with a translatable body, according to at least one embodiment of the present disclosure.

FIG. 9 is a side view of yet another embodiment of a display mount 400 according to the present disclosure. As described herein, the arm 406 may be rotatable relative to the body 404 of the display mount 400. In some embodiments, the arm 406 is translatable relative to the body 404. For example, the body 404 may have a body length 456. The arm 406 is movable in the direction of the body length 456 and may be positioned at various locations along the body length 456.

A position of the arm 406 may be considered to be where the arm axis 442 intersects the upper surface 416 of the body 404. For example, the body end 458 of the arm axis 442 may be located at the upper surface 416 of the body 404 at a variety of locations along the body length 456. In some embodiments, the body end 458 of the arm axis 442 may be at a position (e.g., movable and fixable) between 10% and 90% of the length of the body length 456. In other embodiments, the body end 458 of the arm axis 442 may be at a position between 20% and 80% of the length of the body length 456. In yet other embodiments, the body end 458 of the arm axis 442 may be at a position between 30% and 70% of the length of the body length 456.

Figure 10:
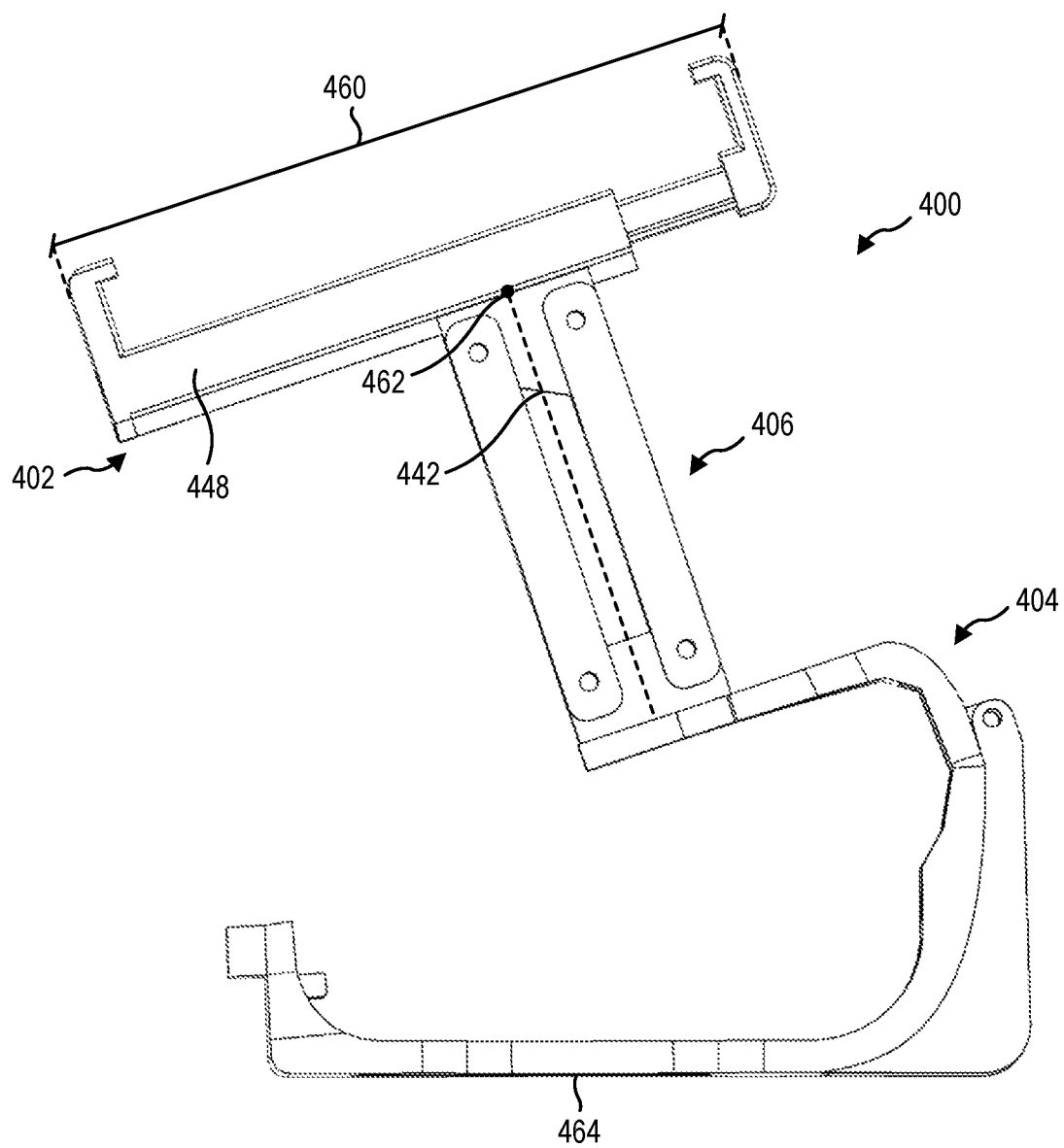
FIG. 10 is a side view of the display mount of FIG. 9 with a translatable display support, according to at least one embodiment of the present disclosure.

Referring now to FIG. 10, as described herein, the display support 402 may be rotatable relative to the arm 406 of the display mount. In some embodiments, the display support 402 is translatable relative to the arm 406. For example, the display support 402 has a first portion 448 that is connected to the arm 406. The first portion 448 has a support length 460. The arm 406 may be considered connected to the first portion 448 of the display support 402 at a support end 462 of the arm axis 442.

In some embodiments, the support end 462 of the arm axis 442 may be at a position (e.g., movable and fixable) between 10% and 90% of length of the support length 460. In other embodiments, the support end 462 of the arm axis 442 may be at a position between 20% and 80% of length of the support length 460. In yet other embodiments, the support end 462 of the arm axis 442 may be at a position between 30% and 70% of length of the support length 460.

In some embodiments, the display mount 400 may support a display without a game controller positioned in the body 404. A base 464 of the body 404 may be substantially flat and/or have a plurality of feet to rest on a flat surface, such as a table or desk. The display mount 400 may support a display on the table or desk while orienting the display toward the user. The user can then interact with the display through a game controller. When the user desires to move locations and take the display and game controller to a new location, the user can attach the game controller to the body 404 and use the display mount 400 to connect the game controller to the display device.

In some embodiments, a base 464 of the body 404 may not provide a sufficiently stable support for the display device. In a particular example, a display support 402 that is translatable relative to the body 404, either by being translatable relative to the arm 406, the arm 406 being translatable relative to the body 404, or both, the display COM may move forward relative to the body 404 and cause the display mount 400 to become unstable on the surface when used as a stand.

Figure 11:
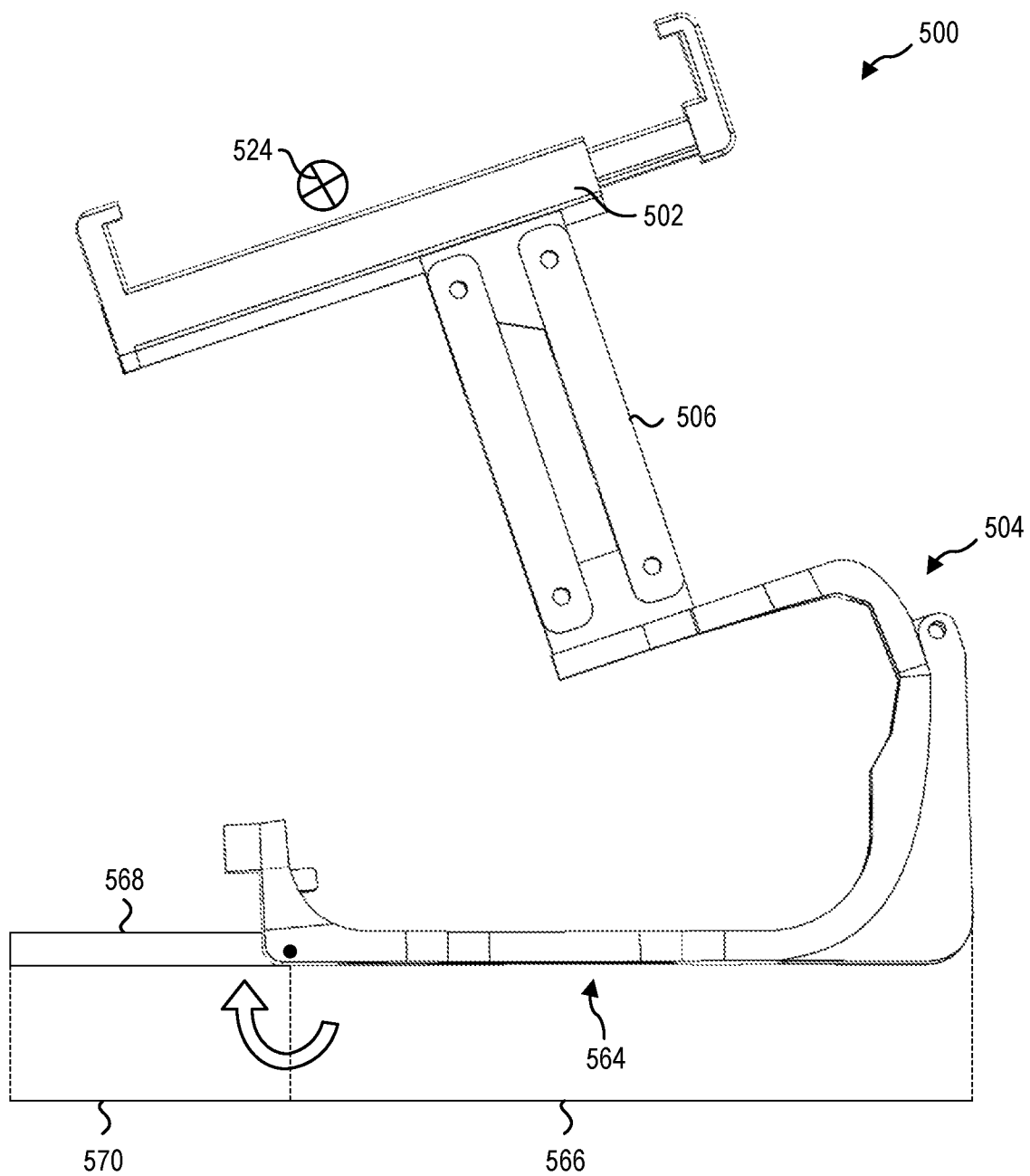
FIG. 11 is a side view of a display mount with an extendable base, according to at least one embodiment of the present disclosure.

The body 404 may include one or more features to extend the 464 to increase stability when used as a stand. For example, FIG. 11 is a side view of another embodiment of a display mount 500 that has a deployable extension 568 that extends from the body 504. In some embodiments, the movement of the display support 502 and/or arm 506 relative to the body 504 can move a display COM 524 near or beyond an edge of the base 564. The extension 568 may extend by folding out from the body 504, sliding out from the body 504, being removably connected to the body 504 (e.g., being snapped onto the body 504), or by other mechanisms. The extension 568 may increase the footprint of the body 504 to stabilize the display mount 500.

The extension 568 has an extension length 570 that is related to a base length 566. In some embodiments, the extension length 570 may be a percentage of the base length 566 in a range having an upper value, a lower value, or upper and lower values including any of 20%, 30%, 40%, 50%, 60%, 70%, 80%, 90%, 100%, or any values therebetween. For example, the extension length 570 may be greater than 20% of the base length 566. In other examples, the extension length 570 may be less than 100% of the base length 566. In yet other examples, the extension length 570 may be between 20% and 100% of the base length 566. In further examples, the extension length 570 may be between 33% and 66%. In at least one example, the extension length 570 may be about 50% of the base length 566. While the embodiment illustrated in FIG. 11 show the extension 568 positioned at a front edge of the base 564, in other embodiments, an extension 568 may be positioned at the front edge of the base 564, a rear edge of the base 564, or both.

In at least some embodiments according to the present disclosure, a display mount connects a game controller to a display device to allow a user to interact with a game or other application on the display device using the game controller. The display mount positions the display above the game controller to align a COM of the display device above the game controller, thereby improving the user experience by reducing fatigue and improving control of the game controller.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

It should be understood that any directions or reference frames in the preceding description are merely relative directions or movements. For example, any references to "front" and "back" or "top" and "bottom" or "left" and "right" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A display mount for connecting electronic devices, the display mount comprising:
 a body having a controller connection mechanism, the body having a lower surface and an opposing upper surface, the lower surface of the body configured to abut an upper surface of a controller;
 a display support; and
 a movable arm connected to the body on the upper surface and to the display support, the arm positioned above the upper surface to hold the display support above the body and opposite the lower surface.

2. The display mount of claim 1, the arm having a range of motion of at least 60° relative to the body.

3. The display mount of claim 1, the controller connection mechanism being elastically deformable to apply a compressive force to a game controller.

4. The display mount of claim 1, the controller connection mechanism including at least one interlocking feature configured to interlock with a complementary feature of a game controller.

5. The display mount of claim 1, the display support being positioned above the body when the upper surface is oriented at an angle between −30° and 45° with a horizontal plane.

6. The display mount of claim 1, the display support including a first portion and a second portion slidable relative to the first portion.

7. The display mount of claim 1, the arm having a length in a range of 1.0 inch to 5.0 inches.

8. The display mount of claim 1, the arm being adjustable in length.

9. The display mount of claim 1, the body having a body length from a front edge to a rear edge, the arm being connected to the upper surface at a position between 10% and 90% along the body length.

10. The display mount of claim 1, a display mount center of mass (COM) of the display mount being located between the upper surface of the body and the display support.

11. The display mount of claim 10, the display mount COM being located in the arm.

12. The display mount of claim 1, the display support being translatable relative to the arm.

13. The display mount of claim 1, the body being translatable relative to the arm.

14. The display mount of claim 1, the arm including a four bar linkage.

15. The display mount of claim 14, the arm including a first bar and a second bar, where the first bar and second bar are not parallel or have different lengths.

16. A system for holding and controlling an electronic device, the system comprising:
   a display device;
   a game controller; and
   a display mount connected to the display device and the game controller, the display mount including:
      a body having a controller connection mechanism connected to the game controller, the body having a lower surface and an upper surface,
      a display support connected to the display device, and
      a movable arm connected to the body and the display support, the arm positioned above the upper surface to hold the display support above the body and opposite the lower surface, wherein the moveable arm is connected to the display support and the controller connection mechanism.

17. The system of claim 16, the display device being a smartphone.

18. The system of claim 16, the movable arm connected to the body and the display support to position the display device and the game controller relative to the display mount such that a system COM is between the upper surface of the body and the display support, the system COM being located in the arm.

19. The system of claim 16, the game controller having a top surface and a display COM of the display device being above the top surface with respect to a direction of gravity when the top surface is between −30° and 45° with a horizontal plane.

20. A display mount for connecting electronic devices, the display mount comprising:
   a body having a controller connection mechanism, the body having a lower surface and an upper surface and the controller connection mechanism being elastically deformable to apply a first compressive force to a game controller;
   a display support including a first portion and a second portion that is slidable relative to the first portion to apply a second compressive force to a display device; and
   a moveable arm connected to the body and the display support, the moveable arm positioned above the upper surface to hold the display support above the body and opposite the lower surface, wherein the moveable arm is connected to the body such that the arm is oriented to extend from a controller when the controller is connected to the body.

* * * * *